United States Patent [19]
Bommeli et al.

[11] Patent Number: 5,455,400
[45] Date of Patent: Oct. 3, 1995

[54] MACHINING TANK WITH A MOBILE PART GIVING A FREE ACCESS TO THE MACHINE AREA OF MACHINE TOOLS

[75] Inventors: Bernard Bommeli, Morges; André Oberson, Geneva, both of Switzerland

[73] Assignee: Charmilles Technologies S.A., Meyrin, Switzerland

[21] Appl. No.: 958,566

[22] Filed: Oct. 8, 1992

[30] Foreign Application Priority Data

Oct. 8, 1991 [FR] France ................... 91 12504

[51] Int. Cl.⁶ .................................. B23H 11/00
[52] U.S. Cl. ................... 219/69.11; 204/224 M; 219/69.14; 451/455
[58] Field of Search ............... 219/69.11, 69.14, 219/69.1; 220/4.12; 204/224 M; 483/14; 173/197; 408/56; 51/7, 240 R, 240 A, 272

[56] References Cited

U.S. PATENT DOCUMENTS 2,867,064 1/1959 Hermansson ................ 51/272
4,484,845 11/1984 Pennella, Jr. et al. ........... 51/272
4,712,288 12/1987 Lodetti et al. ................ 219/69.1

FOREIGN PATENT DOCUMENTS

| 0123792 | 11/1984 | European Pat. Off. . |
| 284808 | 10/1988 | European Pat. Off. . |
| 2266571 | 10/1975 | France . |
| 2539208 | 7/1984 | France . |
| 3213013 | 10/1983 | Germany ............ 219/69.14 |
| 3303758 | 8/1984 | Germany . |
| 61-226223 | 10/1986 | Japan ................ 219/69.11 |

*Primary Examiner*—Geoffrey S. Evans
*Attorney, Agent, or Firm*—Gifford, Groh, Sprinkle, Patmore and Anderson

[57] ABSTRACT

A work tank for machine tools for receiving the machining fluid comprising a fixed part and a movable part which retracts to move the tank away from the work area when it is necessary to remove a workpiece.

9 Claims, 2 Drawing Sheets

MACHINING TANK WITH A MOBILE PART GIVING A FREE ACCESS TO THE MACHINE AREA OF MACHINE TOOLS

The present invention refers to work tanks for machine tools, designed to receive the machining fluid and a workpiece and comprising a fixed and mobile part.

It also refers to these machines, in particular electroerosion machines equipped with such a tank.

In machine tools of known type, in particular electroerosion machines, the work tank completely surrounds the machining area during operation. In order to give free access to this area to facilitate the removal and re-fitting of workpieces, various solutions have been proposed in the present state of technology:

- a tank with collapsible sides as described for example in CH 551 904, but their dismantling gives rise to real waste of time;
- a tank with walls constructed in the form of an accordion as described for example in CH 400 408, DD 26 53 47, EP 347 716, or made up of telescopic elements as described for example in the Japanese publication 2-048113, so as to retract at the level of the work table. However, these systems are relatively expensive and there is a risk that the metallic waste from the machining will jam the mechanisms that fold up the walls, and make them less watertight. Finally, the folded walls form an obstacle around the workpiece clamping table, and even though the obstacle is not high it hinders the transfer of the workpiece to and from a pallet placed at the level of the clamping table;
- a tank or an ensemble made up of four walls, which is mobile and can be pivoted laterally between a machining position and an inoperative position away from the machining area, has described for example in DE 32 13 013, FR 2 266 571. This arrangement has at least two disadvantages: it is necessary to protect the path of pivoting for safety reasons, and the space occupied by the tank or mobile part in the inoperative position could better be used for placing devices involved in workpiece or tool changing, or for other devices;
- a tank that retracts into the base of the machine by sliding along a central column or along pillars, as described in FR 1 235514, DE 1 217 005 and U.S. Pat. No. 3 612 810;
- a tank with a fixed rear wall, along which slides the mobile ensemble formed by the three other walls and the bottom, between the working position and a withdrawn position in the base, as described for example in DE 25 14 899;
- a tank with a fixed part comprising the bottom and the rear wall, and a mobile part consisting either of the three other walls and sliding as above between a working position and a withdrawn position in the base, as described for example in EP 123 792, or consisting of the front wall and the adjacent parts of the side walls and sliding along the fixed parts of the side walls, as described in the Japanese publication 2-00027.

However, these three latter solutions have the disadvantage of making use of sliding devices that during machining are in contact with the liquid containing metallic fragments, causing a lack of reliability due to the risk of jamming, furthermore, is necessary to wait for the end of the withdrawal movement for the level of the work table to be freed. Also, there tracted walls clutter up either the rear of the working plane, or the base, whereas these spaces are very useful for placing, for example, workpiece or tool changer robots or magazines, machining liquid injection or filtration devices, containers for used liquid, or for used wire in the case of wire cutting machines.

The present invention proposes to overcome these disadvantages by creating a tank with a fixed part and a mobile part, in which the mobile part retracts so that the work area is freed as soon as the retraction operation begins and neither the areas around the machining plane nor the base are obstructed.

This objective is attained by a machining tank that has a fixed part and a mobile part. According to the invention, the fixed part comprises the bottom and the rear wall and in certain cases an adjacent part of the side walls of the tank, and the mobile part comprising the front wall and at least a part of the adjacent side walls. This tank is designed to be able to occupy a low position, called working position, in which it is fitted in a tight manner to the fixed part to form the said tank, and a high position, called inoperative position, in which it is raised above the fixed part.

To allow this movement, the tank advantageously includes articulated fittings to raise the said mobile part. By means of a particularly advantageous structure, the said articulated fittings are designed to raise the mobile part parallel to itself. They preferably include a pair of parallel arms, coupled to the fixed part on the one hand and to the mobile part on the other hand.

To facilitate the maneuvering of the mobile part, the said articulated fittings can be associated with mechanical devices to move the said mobile part. These mechanical devices can include at least one spring and/or at least one counter weight and/or at least one hydraulic or pneumatic jack. They can also include an electromechanical power unit.

Advantageously includes a part working in conjunction with a device for blocking or stopping the mobile part of the tank in the high position to ensure the safety of operators when said mobile part is raised.

In a particularly advantageous variant of the present invention, the mobile part in the high position rests against the element of the machine's base structure into which the tool holder is fitted, i.e. the machining head. The blocking device mentioned above can then be mounted on this element and include a component actuated by a spring or by any other mechanical, pneumatic, hydraulic, magnetic or electric system of known type, so as to fit into a housing provided in the mobile part of the tank and to hold the latter in the high position. When the movement raising the mobile part is carried out, it is preferable for the machining head and the work table carrying the tank to occupy a predetermined relative position.

By means of a particularly advantageous form of construction, the machining head can have an overhang equipped for example with a rim, or profiled so as to hold the mobile part; this element is actuated for example by the numerical control of the machine, in such a way as to fit the rim under the mobile part.

To prevent the machining liquid that is still wetting the mobile part from dripping off when the mobile part is raised, the latter is equipped along its lower edge with a sloping gutter which constitutes a drainage channel for the liquid and leads it to a container.

The electroerosion machine according to the invention is characterized in that it includes a machining tank of this type.

The present invention will be better understood with reference to a preferred form of construction carried out on a die sinking electroerosion machine as in the annexed drawings, in which.

With reference to the figures, the electroerosion machine represented comprises a base 10 which supports a column 11 carrying a machining head 12. Mounted on the base 10 is a table with crossed XY movements that is mobile along two orthogonal axes X and Y thanks to slides 13a and 13b associated with axial displacement mechanisms that are of known type. These mechanisms include for example two stepping motors and two ball screws driven by these motors.

Mounted on the machining head 12, is an electrode holder 14 that can move vertically along a Z axis and can rotate around this axis in two opposite directions represented by the double arrow R. The mechanisms allowing displacements of the machining head are also of known type. They include for example a first stepping motor coupled to a ball screw to generate the displacement along the Z axis and a second stepping motor coupled to a ball screw which meshes with a toothed wheel with an axis parallel to the Z axis to generate a rotation of the machining head in either of the two directions as shown by the arrow R.

Figures 1, 2:
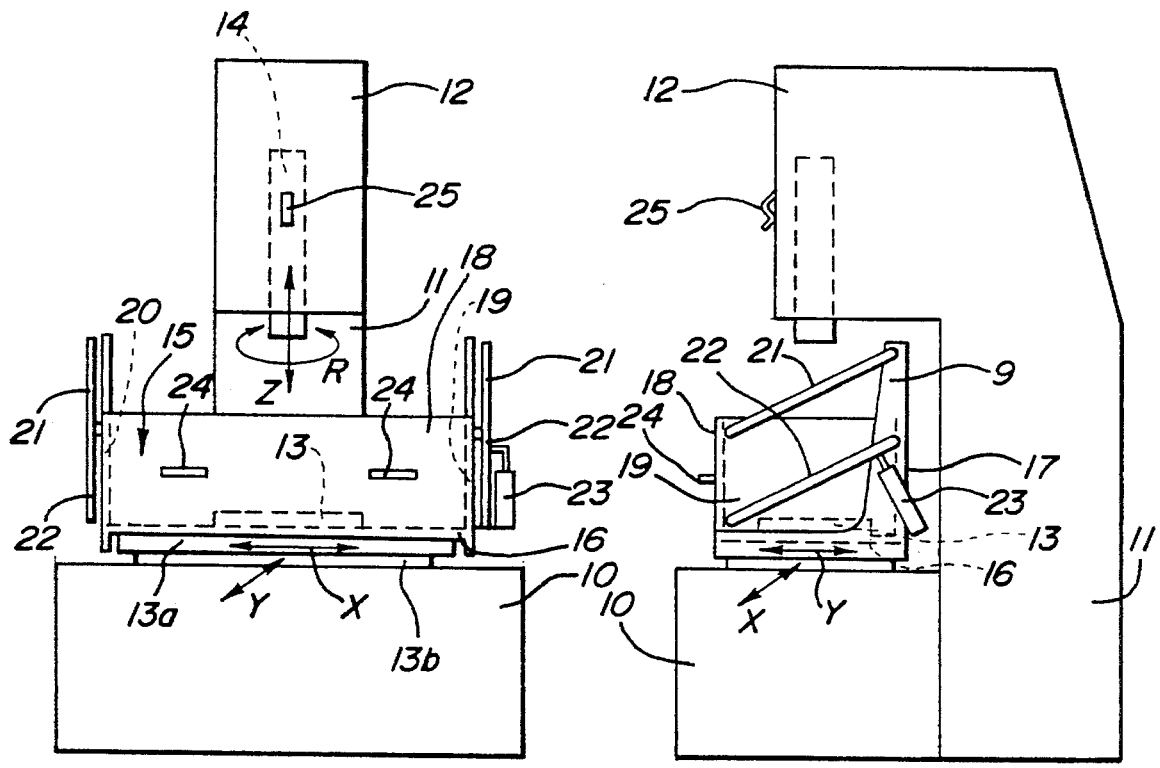
FIG. 1 represents a front view of the first form of construction of an electroerosion machine according to the invention, in which the tank is in the low position.
FIG. 2 represents this machine in the same position but seen from the side.
Figures 3, 4:
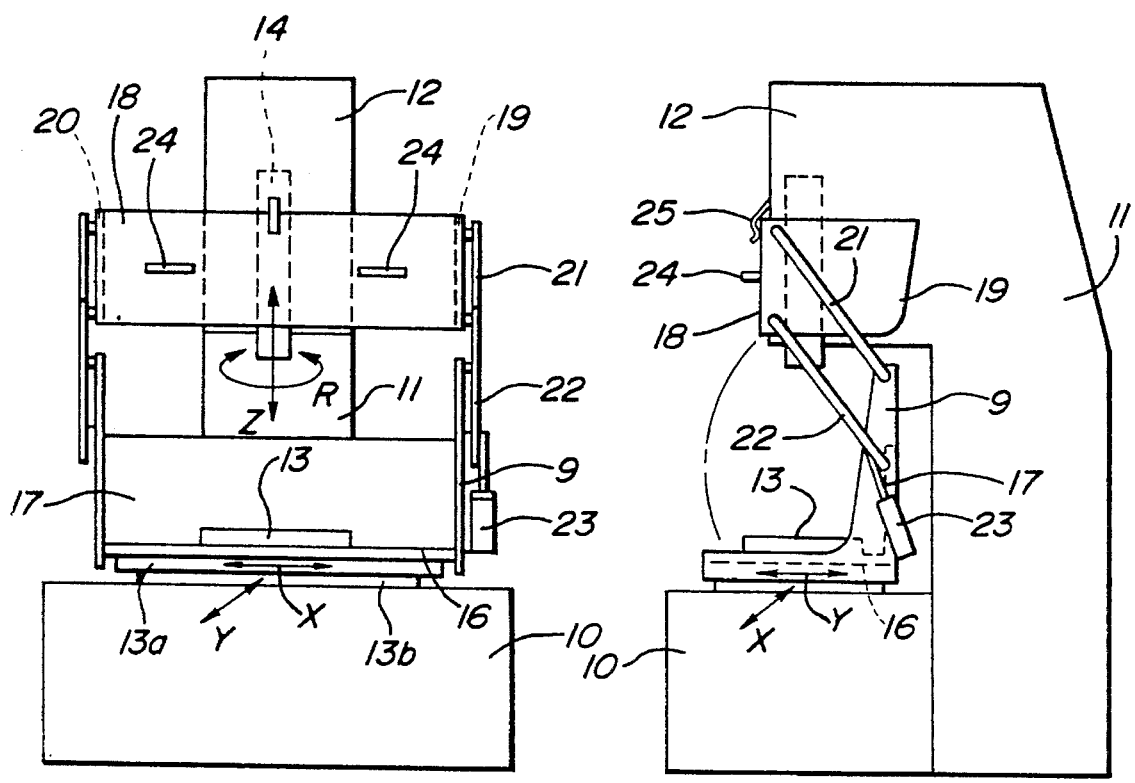
FIG. 3 represents a front view of this electroerosion machine in which the tank is in the high position.
FIG. 4 represents this machine in the same position, but seen from the side.
Figure 5:
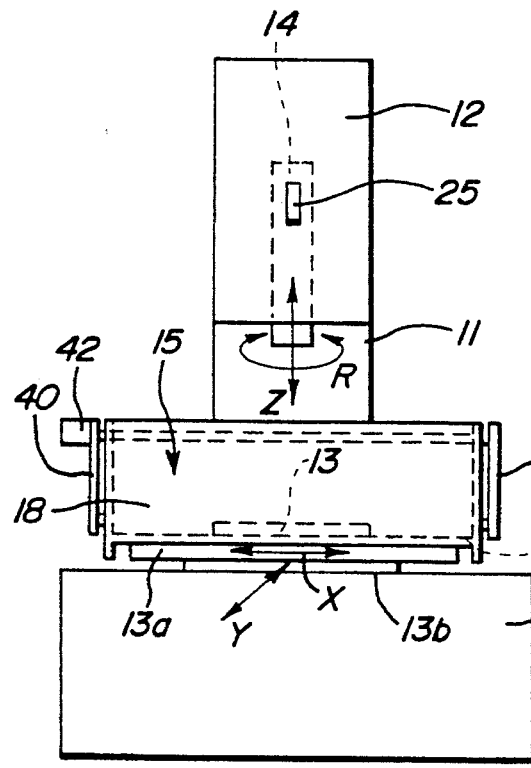
FIG. 5 represents a front view of a second form of construction of an electroerosion machine according to the invention, is in the low position.
Figure 6:
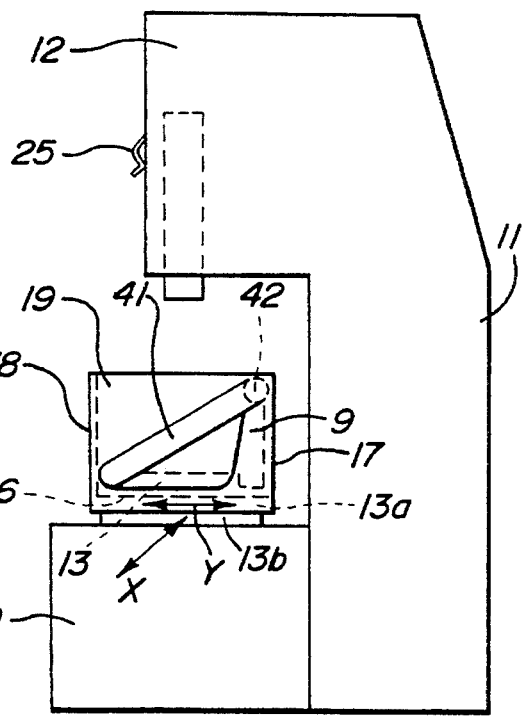
FIG. 6 represents this machine in the same position, seen from the side.
Figure 7:
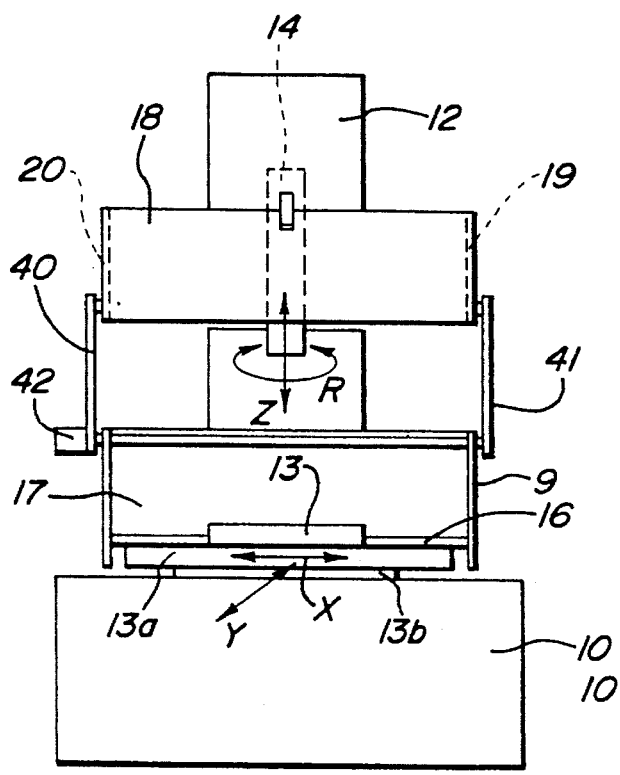
FIG. 7 represents a front view of this machine with the tank in the high position.
Figure 8:
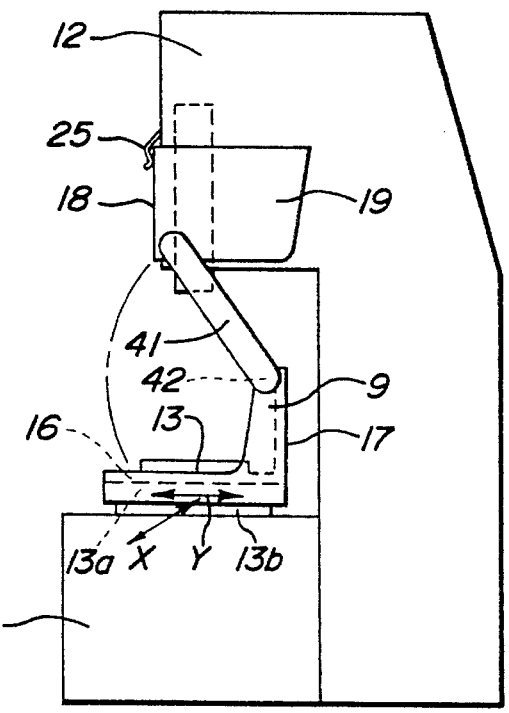
FIG. 8 represents this machine in the same position, seen from the side.

The workpiece clamping table 13, called the work table, is fixed to the cross table XY and is embedded in the bottom 16 of a work or machining tank 15. The machining tank is consists of a fixed part and a mobile part. These two parts are fit together in a tight manner in order to contain a dielectric liquid during the operating phase. According to a variant not shown, the work table 13 can constitute this bottom 16. The fixed part comprises the bottom 16 and the rear wall 17 of the tank 15, such as the part 9 of the side walls which is adjacent to the rear wall 17. These parts 9 are advantageously provided with an oblique profile, fitted particularly for facilitating the tight fitted connection of the mobile and fixed parts of the tank. Moreover, according to the preferred embodiment illustrated in that example, they extend under the bottom of the tank, such as to screen the upper slide of the XY table, and slide X is the variant represented in the drawings. The mobile part consists of the front wall 18 and the parts 19 and 20 of the two side walls. Two pairs of articulated arms 21 and 22, parallel with each other to form a parallelogram, and make it possible to displace the mobile part of the tank 15 from a low position, called the machining position, shown in FIGS. 1 and 2, to the high position, called the operative position, shown in FIGS. 3 and 4. The arms 21 and 22 are coupled on the one hand to the lateral extremities integral with the fixed part and on the other hand to the mobile parts 19 and 20 of the side walls. In the construction represented by way of example in FIGS. 1 to 4, the displacement f the mobile part from its low position to its high position is done by means of a hydraulic or pneumatic jack 23 whose body is fixed to the bottom 16 or to the rear wall 17 of the tank and whose piston rod is fixed to one of the articulated arms, in that example, to the arm 22. It is of course understood that this mechanism could be replaced by any other mechanism having an equivalent function. The mobile part of the tank can also be raised manually. For this purpose, the front wall 18 is equipped with two handles 24. It would also be possible to provide a winch with a crank handle, a counter weight, etc. To prevent the remaining dielectric from flowing and dripping into the work area when the mobile part is raised, the latter is equipped along its loweredge with a sloping gutter which constitutes a drainage channel for the liquid and leads it to a collecting tank that is not shown. In its raised position, the mobile part of the tank 15 is held by a blocking device 25 which is, in that example, made up of a curved leaf spring which is supported by or fits into an appropriate depression of the front wall 18 (see FIG. 4).

FIGS. 5 to 8 represent a form of construction of the electroerosion machine defined above which differs from the construction illustrated by FIGS. 1 to 4 in so far as the tank raising mechanism has two pairs of arms close together and masked by hoods 40 and 41 and also an electric motor 42 which actuates the arms. The other components of the machine are identical and will not be described in detail They have the same references as those attributed to the corresponding components of the machine represented by FIGS. 1 to 4.

The present invention is not limited to the forms of construction described, but can be subject to various modifications and take the form of different variants that are evident to an expert in the art.

Hence, the fixed part of the work tank can be constituted only by its bottom and rear wall and the mobile part can be compressed of the front wall and all of side walls.

The device of the present invention can be mounted on a diesinking machine whose electrode is not rotary. The work table 13 can be separated from the cross table XY by the bottom of the machining tank and fixed or embedded in the latter, or it can even actually constitute the latter. This work table can be fixed, while the machining head is actuated for example along crossed X and Y axes perpendicular to the Z axis.

According to other variants, the device of the present invention can be mounted on a wire-electrode electroerosion machine and in the high position can rest against the carriage carrying the upper head.

The device according to the present invention can also be mounted on a machine that has no column, but a gantry, or having any other known type of construction.

We claim:

1. A work tank for machine tools designed to receive a machining liquid for machining a workpiece, said work tank comprising a fixed part and a mobile part, said fixed part being a bottom and a rear wall of said tank and said mobile part being a front wall and at least part of one of a pair of side walls of said tank, said mobile part having a first machining position, in which it is sealed against said fixed part to form said tank, said mobile part further having a second inoperative position, in which it is raised above said fixed part.

2. The work tank according to claim 1 further comprising articulated fittings to raise said mobile part.

3. The work tank according to claim 2 wherein said articulated fittings raise said mobile part along a plane parallel to said fittings.

4. The work tank as described in claim 2, wherein said articulated fittings include two pairs of parallel arms, said parallel arms are coupled to said fixed part at one end, said parallel arms are coupled to said mobile part at the other end.

5. The work tank according to claim 2, wherein said articulated fittings are connected to mechanical devices to move said mobile part.

6. The work tank according to claim 5, wherein said mechanical devices include an electromechanical power unit with at least one spring and counterweight.

7. The work tank according to claim 1, wherein said mobile part includes a device functioning in conjunction with a blocking device in said second position.

8. The work tank according to claim 5, wherein said mechanical devices include an electromechanical power unit with a hydraulic jack.

9. The work tank according to claim 5, wherein said mechanical devices include an electromechanical power unit with a pneumatic jack.

* * * * *